Patented June 17, 1924.

1,498,274

UNITED STATES PATENT OFFICE.

HERMAN HEUSER, OF EVANSTON, ILLINOIS.

ART OF PREPARING PURE ETHYL HYDROXIDE.

No Drawing.   Application filed July 8, 1922.   Serial No. 573,720.

*To all whom it may concern:*

Be it known that I, HERMAN HEUSER, a citizen of the United States, residing at Evanston, in the county of Cook and State of. Illinois, have invented a new and useful Improvement in Art of Preparing Pure Ethyl Hydroxide, of which the following is a specification.

The present invention relates to the preparation of ethyl hydroxide, completely free from aldehydes and fusel oil in so far as these can be chemically detected.

Ordinary distilled alcohol and even highly refined alcohols ordinarily contain furfural and fusel oil and invariably contain aldehydes, the latter resulting from oxidation resulting from the presence of even minute traces of oxygen or air. In preparing a completely purified alcohol I use a distilled alcohol, preferably a rectified or dehydrated alcohol of a proof from 190° to 200°, diluted to below 62° proof and preferably 60° proof, and remove from it the toxic aldehydes and fusel oils by adding thereto chloroform or a solvent having similar properties, such as carbon tetrachloride, carbon disulphide or tetrachlorethane. The water used for dilution is de-oxygenated or boiled distilled water and during the dilution the alcohol is cooled to prevent heating. The diluted alcohol and chloroform are vigorously agitated, the chloroform being thereby dispersed in finely divided condition through the alcohol.

The agitation is sufficiently vigorous to give the mixture the appearance of an emulsion. The mixture is then permitted to settle and the chloroform, containing the entire content of fusel oil, aldehydes, furfural and pyridine bases, is completely separated. The ethyl hydroxide layer is then placed in the receptacle which has previously been completely freed from air, preferably by the passage of carbon dioxide gas, and the pressure in the receptacle is then reduced to 20 to 40 mm. absolute. Under these conditions any traces of chloroform remaining in the alcohol (there being always sufficient to impart a chloroform odor thereto) are removed by evaporation, which may be aided by the introduction of air-free and oxygen-free carbon dioxide in small amounts. The introduction of carbon dioxide is continued after the chloroform has been removed from the ethyl hydroxide in order to displace any chloroform vapors present in the receptacle and to prevent their reabsorption when the vacuum is broken. The vacuum is broken by the introduction into the receptacle of an inert atmosphere, preferably an atmosphere of carbon dioxide. The temperature of the alcohol during the period in which the chloroform is being removed therefrom should not exceed 20° C., the formation of additional aldehyde to contaminate it being thereby prevented.

The ethyl hydroxide produced is a dilute product containing slightly less than 30 per cent of ethyl hydroxide. It is substantially odorless, of very mild taste and entirely free from aldehydes, fusel oils, furfural and pyridine bases, none of these being detectable in the product by chemical means.

I claim:

1. The method of preparing ethyl hydroxide which comprises diluting high proof distilled ethyl alcohol with oxygen-free distilled water to below 62° proof, agitating it with chloroform and removing the chloroform and dissolved impurities therefrom.

2. The method of preparing ethyl hydroxide which comprises diluting high proof distilled ethyl alcohol with oxygen-free distilled water to below 62° proof, agitating it with chloroform, removing the chloroform and dissolved impurities therefrom and subjecting the ethyl hydroxide to vacuum to remove choloroform vapors therefrom while maintaining a temperature not above 20° C.

HERMAN HEUSER.